United States Patent [19]
Wesner

[11] 3,746,843
[45] July 17, 1973

[54] DIGITAL COMPASS REPEATER READOUT DEVICE

[75] Inventor: Charles R. Wesner, Crozet, Va.
[73] Assignee: Sperry Rand Corporation, New York, N.Y.
[22] Filed: Dec. 15, 1970
[21] Appl. No.: 98,220

[52] U.S. Cl............. 235/92 EA, 33/325, 73/178 R, 235/92 R, 235/92 DN, 235/150.26
[51] Int. Cl. ........................................... G06m 3/06
[58] Field of Search ................. 235/92 MT, 92 DN, 235/92 EA, 92 TC, 150.26, 92 PS, 92 MP, 92 CV; 73/383, 178 R; 33/226.6; 340/211, 27 NA, 27 AT, 347 NT; 74/5.6

[56] References Cited
UNITED STATES PATENTS
3,307,143  2/1967  Wyse et al. .................... 235/92 DN
3,405,221  10/1968  Nelson .......................... 235/150.26

Primary Examiner—Maynard R. Wilbur
Assistant Examiner—Joseph M. Thesz, Jr.
Attorney—S. C. Yeaton

[57] ABSTRACT

A solid state digital readout device for use with gyrocompass step data in the form of either current sinking logic or current sourcing logic. The input data is waveshaped in a plurality of parallel connected Schmitt trigger circuits and coupled through inverter and switching circuits to decode gates connected in parallel with an integrated circuit decoder unit. Outputs from the decoder unit are coupled to a segmented display which provides a visual indication of direction of turn in accordance with the clockwise and counterclockwise sequential illumination of the segments and a visual indication of heading in sixths of a degree. The decode gates provide count up pulses or count down pulses for each degree of rotation in accordance with heading. These pulses are summed in an up/down counter which has its outputs coupled through a binary coded decimal decoder and applied to a display unit which indicates heading in degrees.

9 Claims, 1 Drawing Figure

Patented July 17, 1973
3,746,843
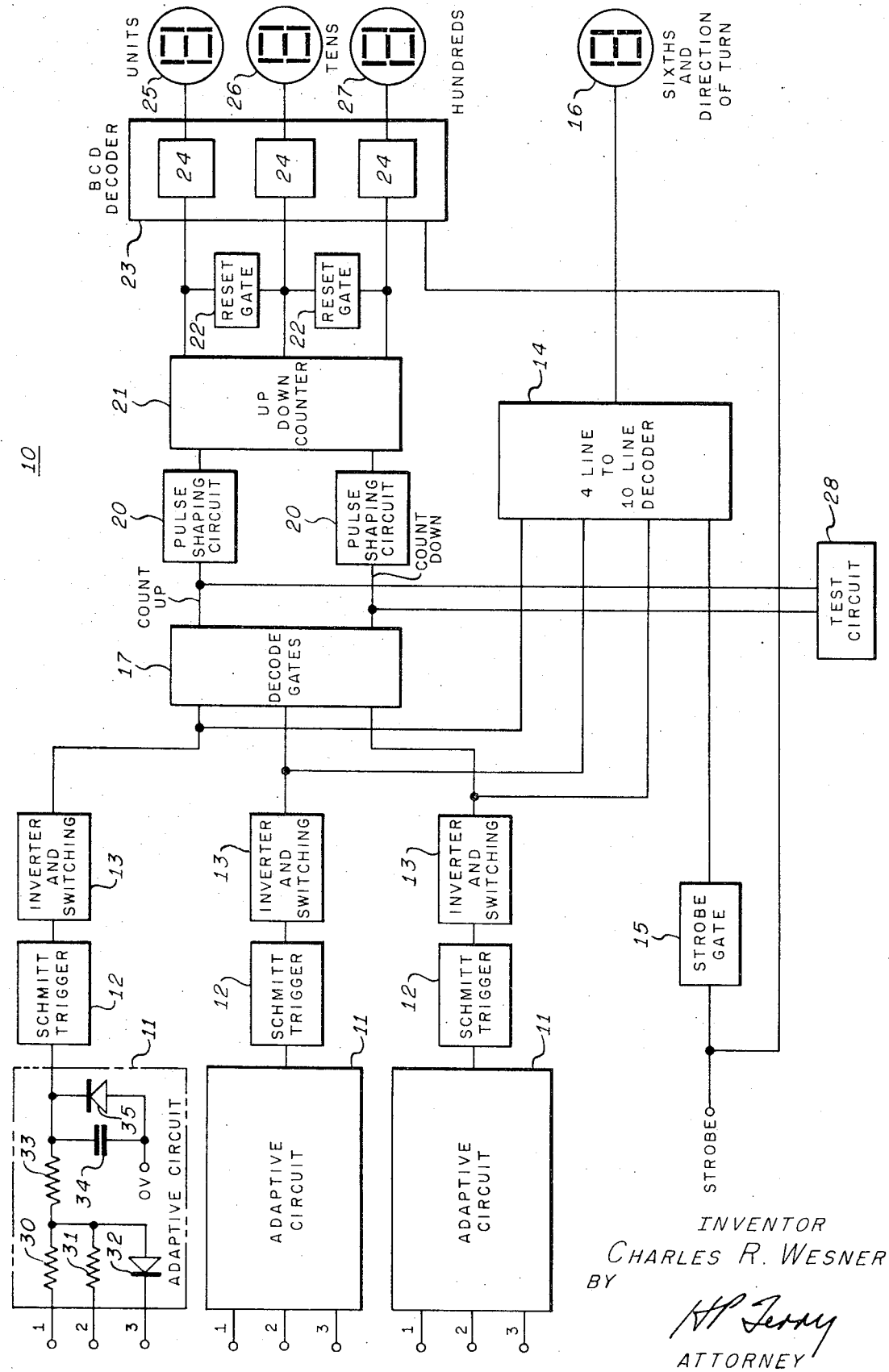
INVENTOR
CHARLES R. WESNER
BY
ATTORNEY

DIGITAL COMPASS REPEATER READOUT DEVICE

BACKGROUND OF THE INVENTION

1. Field of the Invention

The subject invention relates to the art of gyrocompasses and particularly those remotely located readout devices operated by signals transmitted from gyrocompasses known as repeater systems.

2. Description of the Prior Art

Prior art repeater systems are analog devices in which the armature of a motor is mechanically geared to an indicating compass card. Heading in degrees is obtained by observing the number on the rotated compass card which is aligned with the lubber line marked on the stationary frame of the repeater assembly. These systems are disposed throughout various parts of a ship, for example, the chart room, the captain's quarters or on the wings of the bridge. Heading indications from a gyrocompass are electrically transmitted to the repeater systems which are used for steering the ship, charting a course, or taking bearings. The electrical signals are generally either synchro outputs or step data outputs that are applied to three pairs of field poles in the motor. A transmitter mounted on the lubber ring of the gyrocompass has brushes which roll over commutator segments and supply current to each of the three pairs of poles in the motor. The soft iron armature of the repeater motor then places itself between one pair of poles, then half way between that pair and the next. This stepping of the armature turns the compass card thereby following the gyrocompass indication.

Step data outputs are either in the form of current sinking logic or current sourcing logic and each step is equivalent to 10 minutes of arc on the compass card. In current sinking logic, switch closure is to common or a low level voltage. In current sourcing logic, switch closure is to positive or a high level voltage. Therefore, it is a requirement of a repeater system that it be capable of working with either type of current logic.

SUMMARY OF THE INVENTION

The subject invention is a repeater system having adaptive input circuits responsive to either current sinking or current sourcing logic step data signals. Schmitt trigger circuits coupled to the adaptive circuits provide output pulses with shorter rise and fall times than the the transitions in the step data signals. Inverter and switching circuits which coact with the adaptive input circuits couple the pulse outputs from the Schmitt trigger circuits into decoding gates. These gates produce an output signal which is connected to a segmented display that has at least six elements arranged in the form of a closed geometrical figure. After six of the elements have been sequentially illuminated in one direction, a pulse output signal is produced by these gates on either one of two output terminals which is coupled through pulse shaping circuits into and up-/down counter. The up/down counter produces a binary coded decimal output signal indicative of the number of pulses received from either of the two output terminals.

A binary coded decimal decoder transforms the up-/down counter output signal into a seven segment output that is connected to a digital display which provides the heading in degrees. Each element in the segmented display represents 1/6 of a degree which is equivalent to 10 minutes of arc. Therefore, minutes of a degree are indicated by the position of element illuminated. Since the elements of the segmented display are arranged in the form of a closed geometrical figure and are sequentially illuminated, direction of turn is indicated by the closekwise or couterclockwise direction around the figure in which the elements are illuminated.

This completely solid state digital compass repeater eliminates the wearing of the mechanical parts in the stepper motor and compass card coupling. It also eliminates the problem of parallax in reading the compass card while providing an economical replacement of the analog devices currently in use.

BRIEF DESCRIPTION OF THE DRAWING

The FIGURE shows a block diagram of a repeater system incorporating the invention.

DESCRIPTION OF THE PREFERRED EMBODIMENT

Referring to the drawing, a digital repeater system 10 includes three parallel adaptive input circuits 11 each having three input terminals 1, 2 and 3. Each of the parallel adaptive input circuits 11 receives one phase of the three wire compass step data. The outputs of the adaptive circuits 11 are coupled through parallel Schmitt trigger circuits 12 and parallel inverting and switching units 13. A decoder gate 14 receives output signals from each of the switching units 13 and a strobe pulse from a strobe gate 15. The decoder 14 is a four-line to ten-like decoder which has its outpput connected to a segmented readout display 16. A plurality of decoding gates 17 are connected in parallel with the decoder gate 14 producing a decoded output pulse on one of its output terminals which are designated count-up and count-down. Two parallel pulse shaping networks 20 provide shaping of the decoded output pulse prior to application of the pulse to an up/down counter 21 which converts series applied pulses at its input to a binary coded decimal output signal. The counter 21 has three sections serially connected for up/down operation. Reset gates 22 coupled between the three sections of the counter 21 operate to reset the sections to 0 0 0 respectively when 3 6 0 is reached during cout-up and to 3 5 9 when 9 9 9 is reached during count-down. A binary coded decimal (BCD) decoder 23 connected to the counter 21 transforms the binary coded decimal output signals into seven segment indicator signals. The BCD decoder 23 includes three decoders 24 that each provide seven segment signals to a plurality of heading indicators 25-units, 26-tens and 27-hundreds.

A test circuit 28 includes a pulse generator (not shown) for providing a dynamic test of the pulse shaping units 20, up/down counter 21, reset gate 22, BCD decoder 23 and indicators 25, 26 and 27. It also enables initial setting of the indicators 25, 26 and 27.

The adaptive input circuits 11 are identical and each have their input terminals, 1, 2 and 3 connected to one terminal of resistors 30 and 31 and the cathode of diode 32, respectively. The anode of diode 32 and the second terminal of resistors 30 and 31 are series coupled through resistor 33 to a common termination including the input terminal of the Schmitt trigger circuit 12, one terminal of capacitor 34 and the cathode of diode 35. 5 volts common is connected to the common termination of the anode of diode 35 and the second terminal of capacitor 34.

In operation, when current sinking logic is used, phases A, B and C are connected to terminals 3 on each of the adaptive circuits 11. Terminals 1 on each adaptive circuit 11 are connected to +5 volts and terminals 2 are left open. If current sourcing logic is used, phases A, B and C are connected to terminals 2 of the adaptive circuit 11 and +5 volts is connected to terminals 3 while terminals 1 are left open. The step data input in usually either a 35 volt or 70 volt level applied to each phase and the input logic is of the form shown in Table I.

TABLE I

|   | 0 | 1 | 2 | 3 | 4 | 5 |
|---|---|---|---|---|---|---|
| A | X | X |   |   |   | X |
| B |   | X | X | X |   |   |
| C |   |   |   | X | X | X |

An X indicates a contact closure in the corresponding phase. The numbers zero through five represent 10 minutes of arc each or 1/6° steps. Therefore, six steps represent 1° heading.

The outputs signals of the adaptive circuits 11 are coupled to the Schmitt triggers 12 where the transition times between the high and low level voltages are decreased to provide shorter leading and trailing edges on the pulses. The improved output pulses of the Schmitt trigger circuits 12 are coupled into the inverting and switching circuits 13. The inverting section is utilized for current sinking logic inputs only. When current sinking logic inputs are to be used in the switching section, the switches are positioned to receive the outputs from the inverting circuits. When current sourcing logic inputs are used, the switches receive the outputs directly from the Schmitt trigger circuits 12. The output pulses from the switching units 13 are decoded in the decoder gate 14 to provide output indications of changes in heading in sixths of a degree. The output indicator 16 displays sixths of a degree by illuminating one or more elements of a six element segmented readout. As shown in FIG. 1, the segmented readout 16 may include more than six elements. However, only the six elements which form a closed loop geometrical figure are used. Direction-of-turn is also indicated by readout display 16 by illuminating the elements in either a clockwise or counter-clockwise direction around the figure. In one embodiment of the invention, sequential clockwise illumination of the elements indicated a direction-of-turn to the right and a counterclockwise sequential illumination of the elements indicated a direction-of-turn to the left.

The outputs of the switches in switching units 13 are also fed into the decode gates 17 which are connected in parallel with the decoder gate 14. An output of the decode gates 17 occurs only after a transition from the sixth to first element or from the first to the sixth element in the readout display 16. The two output terminals of the decode gate 17 indicate whether the count has transversed from the sixth to the first element (i.e., from A-C to A in Table I) or from the first to the sixth element (i.e., from A to A-C in Table I). If the count has transversed from the sixth to the first element, an output pulse will occur on the count-up terminal of the decode gate 17. If the count has transversed from the first to the sixth element, an output will occur on the count-down terminal of the decode gates 17.

The output pules from the decode gates 17 is shaped in pulse shaping circuits 20 and coupled into the first section of the three sections of the up/down counter 21. The up/down counter 21 converts serial pulses received on the input lines into a binary coded decimal format which is coupled into the BCD decoder 23. The three decoders 24 which correspond to three series-connected sections in the up/down counter 21 transform the binary coded decimal signals received from the up/down counter 21 into a seven segment decimal format. The seven segment decimal signals are applied to the units 25, tens 26 and hundreds 27 indicators providing a visual readout of heading as expressed in degrees. When the count in the three series-connected sections of the up/down counter 21 have reached 3 6 0 respectively, the reset gates 22 reset each section to 0 0 0. During count-down when each section has readhed 9 9 9, the reset gates 22 reset the three sections in the up/down counter 21 to 3 5 9, respectively.

The test circuit 28 includes a toggle switch S1, not shown, which controls the rate at which pulses are generated by the pulse generator in the test circuit. The fast rate provides pulses at a rate equivalent to 10° per second and the slow rate provides pulses at a rate of 1° per second. The switch also controls the application of these pulses to either the count-up or the count-down output terminal on the decode gates 17. During initial setting of the display the toggle switch is used to align the digital readout to the heading.

While the invention has been described in its preferred embodiment, it is to be understood that the words which have been used are words of description rather than limitation and that changes may be made without departing from the true scope and spirit of the invention in its broader aspects.

I claim:

1. A ditial compass repeater readout device coupled to a gyrocompass apparatus which provides three wire compass step data indicative of direaction of turn and heading in degrees and factions of a degree comprising
   input circuit means coupled to said gyrocompass apparatus for receiving said three wire compass step data and producing three wire coded pulse data,
   first decoding means coupled to said input circuit means for receiving said three wire coded pulse data and providing decoded output pulses in accordance with direction of turn and heading in fractions of a degree,
   second decoding means coupled to said input circuit means for receiving said three wire coded pulse data and providing serial output pulses in accordance with direction of turn and heading in degrees,
   pulse counter means coupled to said second decoding means for producing binary coded decimal output signals in response to said serial output pulses,
   third decoding means coupled to said counter means for receiving said binary coded decimal output signals and providing decimal output signals, and
   display means coupled to said first and third decoding means for providing a visual digital readout indicative of direction of turn and heading in degrees and fractions of a degree.

2. A digital compass repeater readout device as described in claim 1 in which said input circuit means includes three parallel adaptive circuits coupled between said gyrocompass and said first and second decoding means for receiving said compass step data signals in current sinking and current source logic form.

3. A digital compass repeater readout device as described in claim 1 in which said first decoding means includes means for converting three wire coded pulse data into sequential output pulses indicative of direction of turn and changes in heading in fractions of a degree.

4. A digital compass repeater readout device as described in claim 1 in which said second decoding means includes means for converting said three coded pulse data into serial pulses on a first output terminal indicative of changes in heading in a first direction and on a second output terminal indicative of changes in heading in a second direction.

5. A digital compass repeater readout device as described in claim 1 in which said pulse counter means includes means for providing binary coded decimal output signals in accordance with the net accumulation of said serial output pulses applied to said counter means.

6. A digital compass repeater readout device as recited in claim 5 in which said pulse counter means further includes an up/down counter having a preset minimum value threshold for decreasing changes in heading and a preset maximum value threshold for increasing changes in heading.

7. A digital compass repeater readout device as recited in claim 1 in which said display means includes a single segmented display for indicating changes in heading in fractions of a degree and direction of turn.

8. A digital compass repeater readout device as recited in claim 7 in which said segmented display includes elements arranged in a closed geometrical figure for indicating direction of turn by sequentially illuminating said elements.

9. A digital compass repeater readout device as recited in claim 1 in which said display means includes four standard seven segmented displays of which three displays indicate heading in degrees and the six outer elements of the fourth display are used to indicate changes in heading in sixths of a degree and to indicate direction of turn by the direction in which said elements are sequentially illuminated.

* * * * *